Feb. 19, 1929.  1,702,284
A. THIEN ET AL
AUTOMOBILE BED
Filed Oct. 18, 1927   2 Sheets-Sheet 1
Fig. 1.
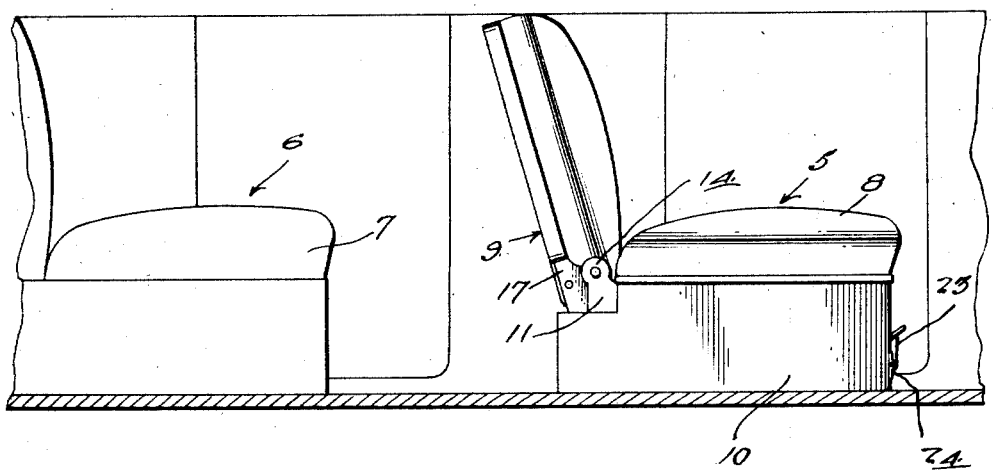
Fig. 5.
Fig. 4.
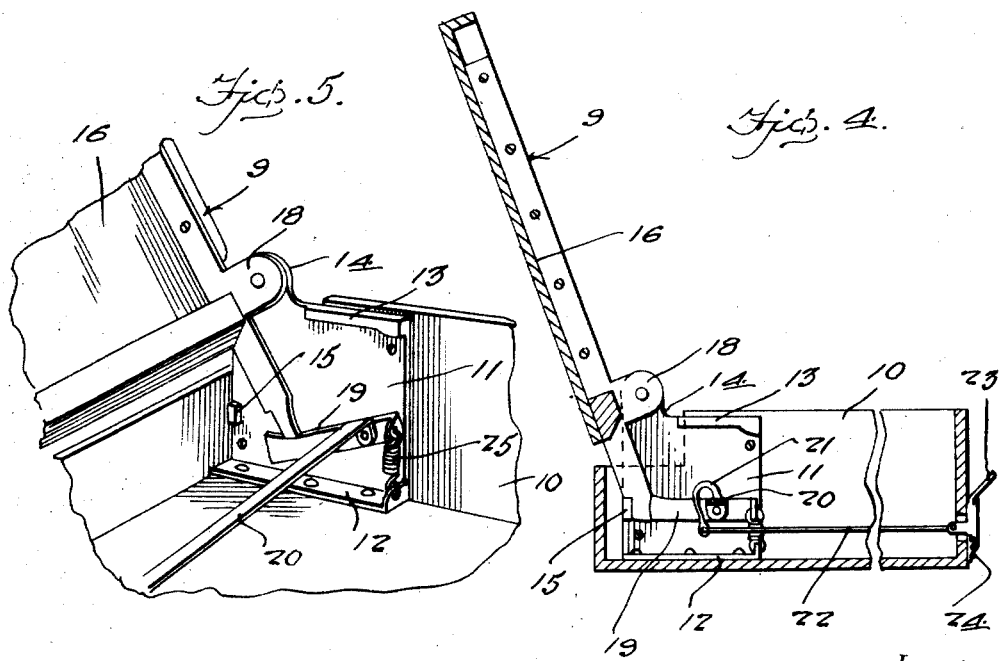
Inventors
Alexander Thien
Andrew Brosnatch
By Clarence A. O'Brien
Attorney

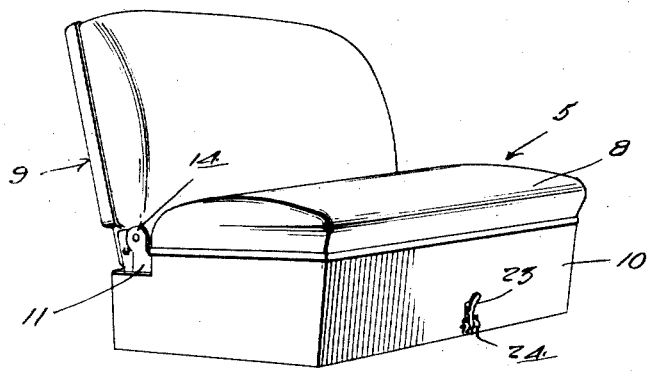
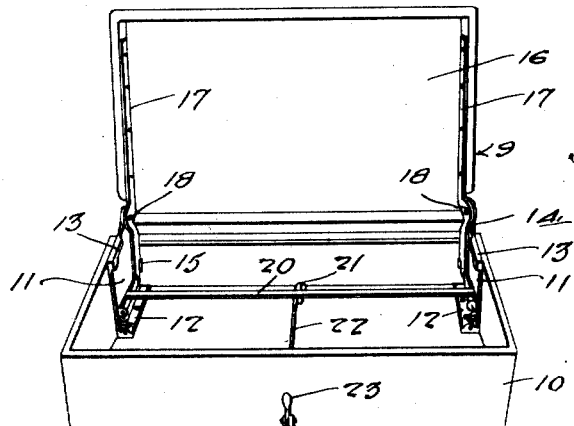
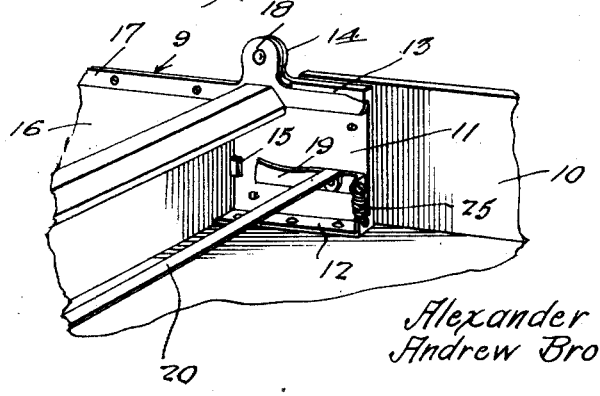
Inventors
Alexander Thien
Andrew Brosnatch

Patented Feb. 19, 1929.

1,702,284

UNITED STATES PATENT OFFICE.

ALEXANDER THIEN AND ANDREW BROSNATCH, OF CHICAGO, ILLINOIS.

AUTOMOBILE BED.

Application filed October 18, 1927. Serial No. 226,925.

The present invention relates to what is known in the art as an automobile bed, and it has more particular reference to a structure of this class wherein the front and rear seat are constructed to permit them to be converted into a bed, thus providing a structure adaptable for touring, camping, and the like.

The principal structural distinction of the present invention is an improved back rest for the front seat which especially is constructed and mounted so that it can be disposed in vertical seat-forming position, and held there in a dependable manner, or can be swung down into a horizontal plane with the front and back cushion to provide a bed, the same being held in the last-named position by dependable means.

The particular details which serve to form the new arrangement will become more readily apparent from the following description and drawings.

In the drawings:—

Figure 1 is a fragmentary view of a portion of an automobile body showing front and rear seats, wherein the front seat is reconstructed in accordance with the present invention to permit it to be converted into a bed, to permit sleeping thereon.

Fig. 2 is a perspective view of the front seat per se showing the back rest in its normal position.

Fig. 3 is a front perspective view with the cushions removed to expose the details of the construction.

Fig. 4 is a cross section through the structure seen in Fig. 3 showing the parts more plainly and somewhat enlarged.

Fig. 5 is a fragmentary perspective view showing the back rest in the act of swinging downwardly to bed forming position.

Fig. 6 is a continuation of Fig. 5, showing the back rest down in its horizontal position.

In the drawings, the reference character 5 designates generally the front seat while the reference character 6 indicates the back seat. Incidentally the back seat is of customary construction, and includes the usual seat-forming cushion 7. The front seat is also provided with a cushion 8. The back rest, however, which is generally designated at 9, is of especial construction. Moreover, the base 10 is constructed in a particular way.

Attention is first invited to the base which is in the form of a substantially rectangular box. Mounted in this box, and fastened to the end walls are duplicate end plates 11 having attaching flanges 12 at their bottoms, and stop flanges 13 at their tops. Each plate is also formed at its top with an upstanding lug 14, and is further formed on the rear side with an appropriately located stop 15. The back rest comprises a backing member 16, to the opposite ends of which metal arms 17 are rigidly fastened. Adjacent their lower ends, these arms are provided with outstanding ears 18, hingedly connected with the aforesaid lugs 14.

The lower ends of the arms extend down below the backing member and are adapted, when in vertical position (see Fig. 4), to engage the stops 15. When in horizontal position however, they bear against the under side of the stop flanges 13 as shown in Fig. 6.

Novel means is provided for holding the parts in these two different positions, and the means comprises a pair of latches 19 pivotally mounted between their ends on the end plates, and connected together for simultaneous operation by a rocker strip 20. On the center of the rocker strip is a curved rocker arm 21 which is connected with a forwardly extending rod or link 22. This rod is also connected with a foot pedal 23 pivotally mounted on a bracket 24 on the front of the base 10.

These latches are constructed for cooperation with the lower reduced end portions of the arms 17. Coiled springs 25 are employed for holding the latches in operative position.

Under normal conditions, when the back rest 9 is in seat forming relation, the parts of the invention assume the association shown in Fig. 2. As represented here, the backing member 16 is in rearwardly inclined position at which time the lower end portion of the arms 17 bear against stops 15, (see also Fig. 4). They are held in this position through the medium of the latches 19. Assuming however, that it is desired to swing the backing member down to horizontal bed forming position, shown in Fig. 6, it is obvious, that it is simply depressed or forced outwardly upon the pedal 23. In so doing, a rearward pull is exerted upon the rod 22, which actuates the rocker strip 20. This in turn releases the latches 19 and permits the end portions of the arms 17 to clear the latches whereby they are then swung from the position shown in Fig. 4, to the position shown in Fig. 6, where they are engaged with the stop flanges 13.

Obviously, with the cushion in place, a bed may thus be formed. The construction, operation, and advantages of the invention will be quite clear from the foregoing description, taken in connection with the drawings, and therefore a mere lengthy description is thought unnecessary.

While the preferred embodiment of the invention has been specifically shown and described, it is to be understood that minor changes in shape, size, and re-arrangement of parts coming within the field of invention claimed, may be resorted to if desired.

Having thus described our invention, what we claim as new is:—

In a structure of the class described, a box-like base, end plates fastened to the end walls of said base, horizontal stop flanges carried by the upper ends of said plates, additional stop members carried by said plates, a backing member, arms fastened to said backing member, a pivotal connection between the arms and plates, said arms including extensions projecting beyond said pivotal connections, whereby they may be engaged either with the stop flanges or said stop members, latches pivotally mounted on said plates and engageable with said arms, for holding the backing member in a vertical position, and manually actuated operating means for the latches, said means comprising a rocker strip connected with the latches, a rocker arm carried by the strip, an operating rod connected with the rocker arm, a pivotally mounted foot pedal on the base, said rod being connected with said foot pedal, and springs fastened to said end plates and latches.

In testimony whereof we affix our signatures.

ALEXANDER THIEN.
ANDREW BROSNATCH.